Patented Feb. 21, 1933

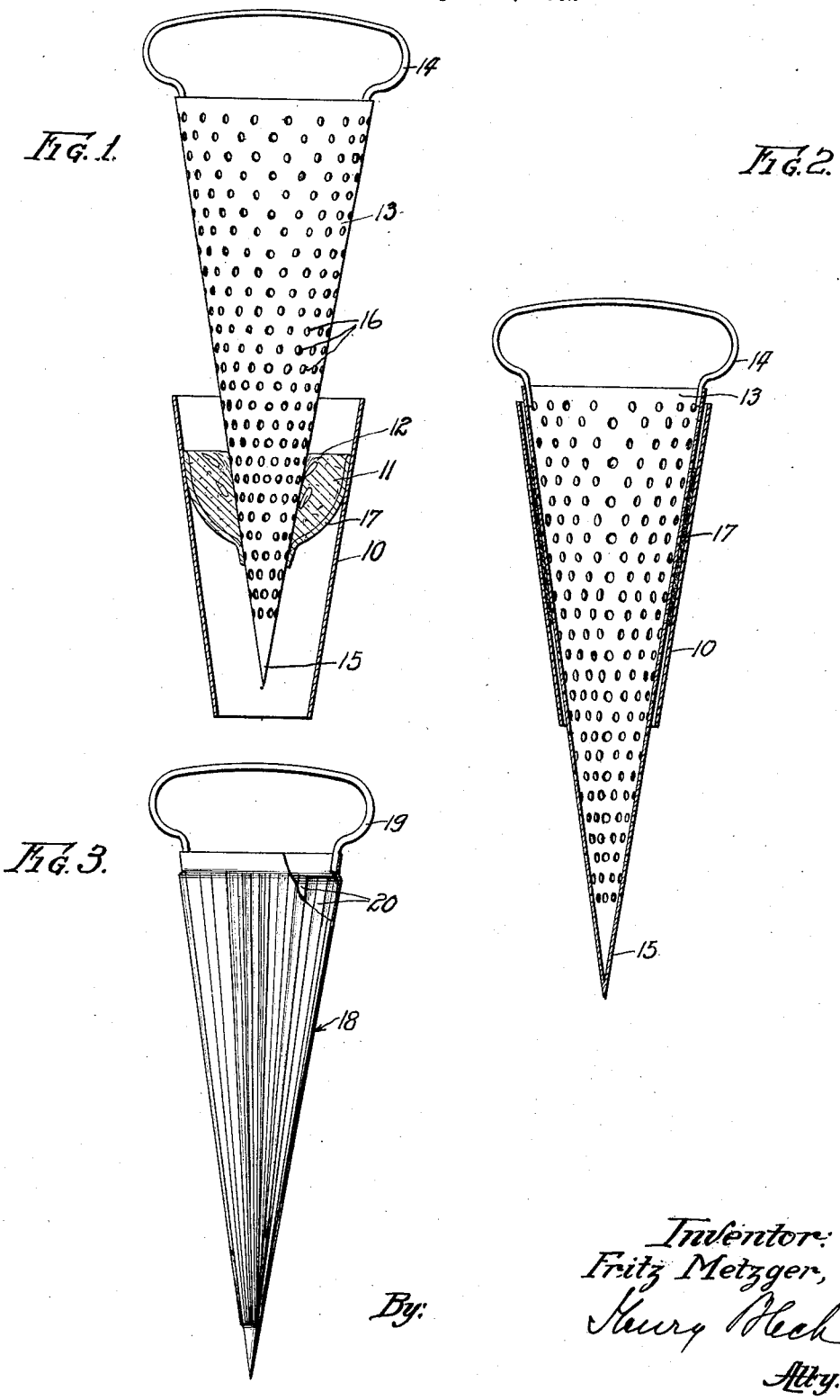

1,898,588

UNITED STATES PATENT OFFICE

FRITZ METZGER, OF CHICAGO, ILLINOIS

DEVICE FOR EXTRACTING FRUIT JUICES

Application filed September 19, 1932. Serial No. 633,793.

The invention relates to extractors and more particularly to a device for extracting the juices of citrous fruits.

It is an object of the invention to provide a device of the character described, which is of simple construction, effective in use and convenient in application.

A further object aims at providing a device wherein the fruit is arranged in a support and an extractor is applied to progressively exert a pressure on the fruit to thereby extract the juice.

It is a still further object to provide an extractor which is adapted to pierce the fruit and to progressively act on the pulp whereby the juice is extracted.

A still further object aims at providing certain details of construction and arrangement tending to enhance the utility and efficiency of a device of this character.

With these and other equally important objects in view which will become apparent from a perusal of the invention, the latter comprises the means described in the following specification, particularly pointed out in the claims forming a part thereof, and illustrated in the accompanying drawing, in which:

Fig. 1 is an elevational view of my improved device, parts being shown in section.

Fig. 2 is a view similar to Fig. 1 with the parts shown in a different position, and Fig. 3 is an elevational view of a slight modification.

Referring to the several views of the drawing the device comprises a holder 10 which is a frusto-cone of considerable height open at the top and at the bottom.

In the holder is arranged one-half of an orange or lemon 11 with a cut surface 12 adjacent to the top of the holder and extending in a horizontal plane.

Cooperating with the holder is a cone member 13 provided at the top with a handle bar 14 to facilitate manipulation of the cone which terminates in a point 15 at the lower end and is of a size so that the cone 13 can be arranged in nested relation with respect to the holder in which the lower portion of the cone protrudes from the lower end of the holder. The cone 13 is provided with a large number of perforations 16.

In use the cone is grasped by its handle 14 and the point 15 is forced through the orange 11. Further movement of the cone in downward direction will cause the vertical pressure created thereby to be resolved into a large number of horizontal components in addition to oblique components.

The provision of the handle 14 enables the application of considerable pressure in the downward movement of the cone and if desired rotation may be imparted to the cone in order to enhance the extraction of the juice.

Attention is called to the fact that the cone is so dimensioned that it affords a long stroke whereby effective pressure is imparted to the citrous fruit.

In the final position of the parts shown in Fig. 2 the juice will have flown through the perforation 16 and will egress through the lowermost perforations into a container (not shown) to constitute a receptacle for the fruit juice.

The rind 17 of the orange or lemon as shown in Fig. 2 including seeds pressed thereinto, is flattened out and is arranged between the walls of the holder and the cone. The rind and seeds can be easily removed upon separation of the parts.

In the modification shown in Fig. 3 a cone 18 is depicted which is dimensioned like cone 13 of the previously described embodiment and is also provided with a handle 19 similar to handle 14. However, the cone is unperforated but is provided with longitudinal ribs 20 extending substantially the entire length of the cone 20 and constituting reamers so that upon rotation of the cone 20 the extraction of the juice is enhanced.

While the drawing shows preferred embodiments of the invention, various changes, alterations, revisions and modifications may be made without departing from the spirit of the invention.

I, therefore, do not limit myself to the details of construction, as shown, but wish to include all changes, alterations, revisions and modifications constituting departures within the scope of the invention, as defined in the appended claim:

I claim:

In a device of the character specified, a frusto-conical fruit holder open at the top and bottom, a conical member adapted to enter said holder and protrude therefrom when in nested relation therewith, the generatrices of said holder and said member being substantially straight lines and having substantially equal angular slope.

In witness whereof I affix my signature.

FRITZ METZGER.